US012593360B2

(12) United States Patent　　(10) Patent No.:　US 12,593,360 B2
　　Lin　　　　　　　　　　　　　　(45) Date of Patent:　Mar. 31, 2026

(54) RANDOM ACCESS METHOD AND APPARATUS, AND TERMINAL, ELECTRONIC DEVICE AND COMPUTER-READABLE STORAGE MEDIUM

(71) Applicant: ZTE CORPORATION, Shenzhen (CN)

(72) Inventor: Lin Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 356 days.

(21) Appl. No.: 18/268,735

(22) PCT Filed: Dec. 24, 2021

(86) PCT No.: PCT/CN2021/141202
§ 371 (c)(1),
(2) Date: Jun. 21, 2023

(87) PCT Pub. No.: WO2022/135565
PCT Pub. Date: Jun. 30, 2022

(65) Prior Publication Data
US 2024/0049293 A1　　Feb. 8, 2024

(30) Foreign Application Priority Data

Dec. 24, 2020　(CN) ......................... 202011545037.4

(51) Int. Cl.
　*H04W 64/00*　　(2009.01)
　*H04W 56/00*　　(2009.01)
　*H04W 74/0833*　(2024.01)
(52) U.S. Cl.
　CPC ... *H04W 56/0045* (2013.01); *H04W 74/0833* (2013.01)

(58) Field of Classification Search
　CPC ......... H04W 56/0045; H04W 74/0833; H04W 36/0072; H04W 64/00; H04L 5/0048; H04L 5/0069
(Continued)

(56) References Cited

U.S. PATENT DOCUMENTS 9,749,927 B2 * 8/2017 Löhr ................. H04W 56/0045
11,553,532 B2 * 1/2023 Shao ..................... H04L 5/0082
(Continued)

FOREIGN PATENT DOCUMENTS

CN　　106034354 A　　10/2016
CN　　107079367 A　　8/2017
(Continued)

OTHER PUBLICATIONS

WIPO, International Search Report issued on Mar. 23, 2022.
(Continued)

*Primary Examiner* — Christopher M Crutchfield
*Assistant Examiner* — Syed Ahmed
(74) *Attorney, Agent, or Firm* — Li & Cai Intellectual Property (USA) Office

(57)　　　　　ABSTRACT

The present application provides a random access method, a random access apparatus, a terminal, an electronic device, and a computer-readable storage medium, the random access method includes: determining a time-adjustment step length according to a physical random access channel (PRACH) format configured for a serving cell where a current terminal is located and a propagation speed of a wireless signal; determining an initial timing advance (TA) according to positioning information acquired from a positioning system; determining a TA according to the time-adjustment step length, a total number of attempt rounds and the initial TA; and initiating at least one round of random
(Continued)

access attempt to a base station according to the TA until the current terminal successfully accesses the base station.

7 Claims, 5 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 11,792,758 | B2 * | 10/2023 | Ren ...................... | H04B 17/104 |
| | | | | 370/503 |
| 2013/0070726 | A1 * | 3/2013 | Zhang ............... | H04W 56/0045 |
| | | | | 370/331 |
| 2014/0369322 | A1 * | 12/2014 | Fwu ........................ | H04L 5/003 |
| | | | | 370/336 |
| 2016/0174177 | A1 * | 6/2016 | Frederiksen .......... | H04W 72/12 |
| | | | | 370/329 |
| 2017/0111103 | A1 | 4/2017 | Rowland | |
| 2020/0068619 | A1 | 2/2020 | Kim | |
| 2020/0266942 | A1 | 8/2020 | Akkarakaran | |

FOREIGN PATENT DOCUMENTS

| | | |
|---|---|---|
| CN | 107734629 A | 2/2018 |
| CN | 108366421 A | 8/2018 |
| CN | 108882248 A | 11/2018 |
| CN | 109495961 A | 3/2019 |
| EP | 2448340 A1 * | 5/2012 ............ H04W 56/00 |
| WO | WO 2020164362 A1 | 8/2020 |

OTHER PUBLICATIONS

Ericsson. "On Random Access in NTN," 3GPP TSG-RAN WG2 #112, R2-2010169, Oct. 23, 2020.
European Patent Office, The extended European search report dated Mar. 11, 2025, for corresponding EP application No. 21909560.1.
Nokia Networks: "Random access procedure for enhanced coverage UEs", 3GPP Draft; R2-154559, 3rd Generation Partnership Project (3GPP), Mobile Competence Centre ; 650, Route Des Lucioles ; F-06921 Sophia-Antipolis Cedex ; France, vol. RAN WG2, no. Malmo, Sweden; Oct. 4, 2015.
European Patent Office, the Supplementary Partial European Search Report dated Nov. 13, 2024, for corresponding EP application No. 21909560.1.
All Md Shipon., et al: "LTE/LTE-A Random Access for Massive Machine-Type Communications in Smart Cities", IEEE Communications Magazine, vol. 55, No. 1, Jan. 1, 2017.
ZTE Corporation et al.: "TP on Random Access for UE with location information", 3GPP Draft, Aug. 30, 2019.
Thales: "NR-NTN Chap 7.3—NR modifications to support the Non-Terrestrial Network", 3GPP Draft, May 29, 2018.
Thales et al: "NR-NTN: solution principles for NR to support non-terrestrial networks", 3GPP Draft, May 29, 2018.
Canada Patent Office, First Office Action dated Oct. 8, 2024, for corresponding CA application No. 3206303.

* cited by examiner

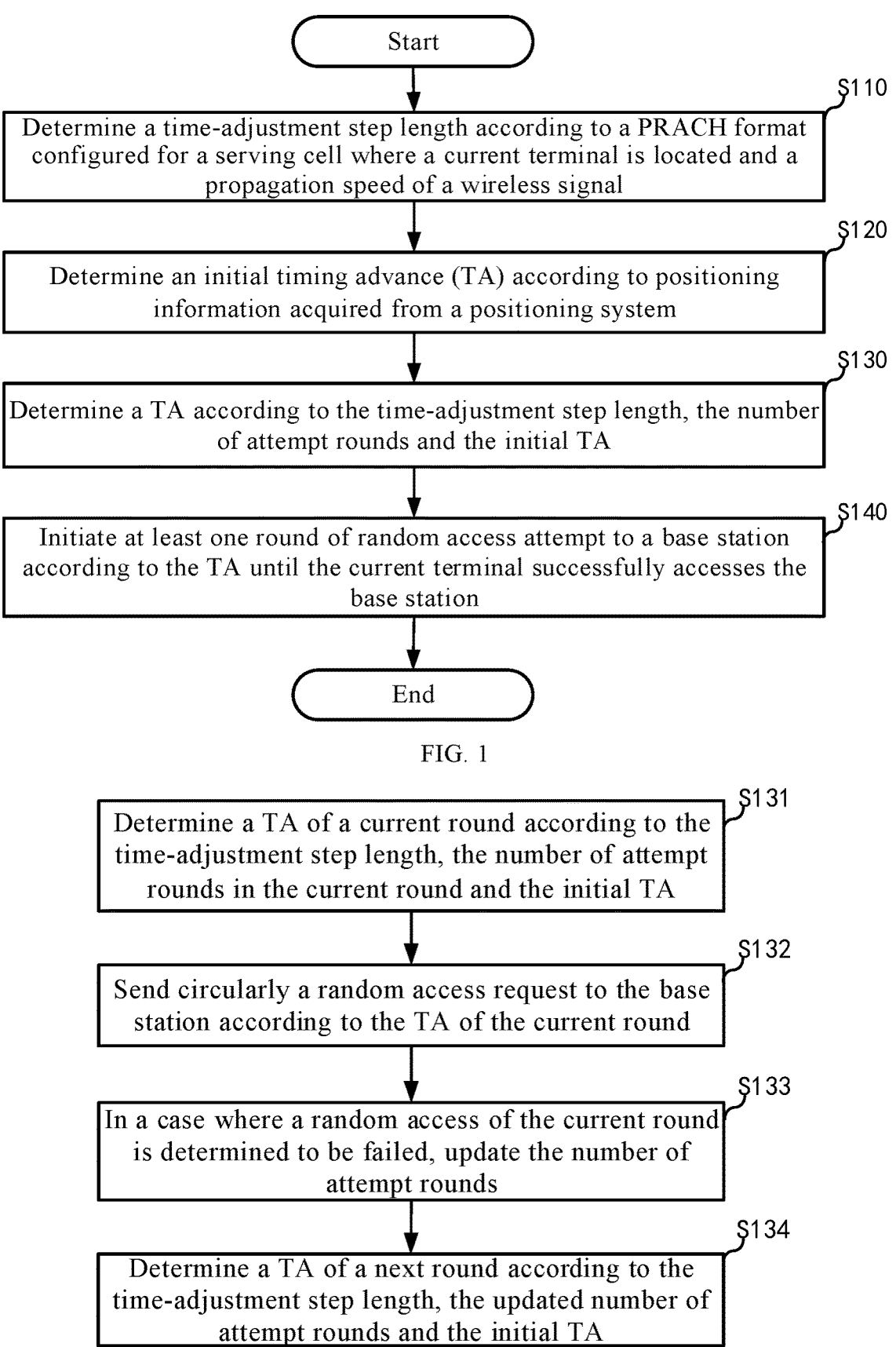

Start

Determine a time-adjustment step length according to a PRACH format configured for a serving cell where a current terminal is located and a propagation speed of a wireless signal     S110

Determine an initial timing advance (TA) according to positioning information acquired from a positioning system     S120

Determine a TA according to the time-adjustment step length, the number of attempt rounds and the initial TA     S130

Initiate at least one round of random access attempt to a base station according to the TA until the current terminal successfully accesses the base station     S140

End

FIG. 1

Determine a TA of a current round according to the time-adjustment step length, the number of attempt rounds in the current round and the initial TA     S131

Send circularly a random access request to the base station according to the TA of the current round     S132

In a case where a random access of the current round is determined to be failed, update the number of attempt rounds     S133

Determine a TA of a next round according to the time-adjustment step length, the updated number of attempt rounds and the initial TA     S134

FIG. 2

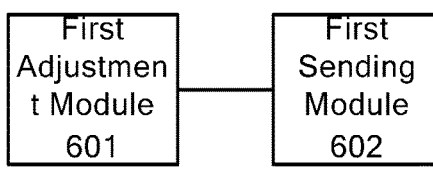

| First Adjustmen t Module 601 | First Sending Module 602 |
|---|---|

FIG. 6

| First Adjustment Module 601 | Second Adjustment Module 603 | Second Sending Module 604 |
|---|---|---|

FIG. 7

Start

S801

According to a PRACH format configured for a serving cell where the 5G terminal is located, information of a 5G base station and the 5G terminal in GPS information, calculate to obtain a timing advance for sending a random access request to the 5G base station

S802

Count the number of attempts to send the random access request according to the timing advance

S803

In a case where the number of the attempts is determined to be greater than a preset sending number, and the 5G terminal is in a state in which the random access fails, enter a procedure of N rounds of random access attempts

S804

Calculate to obtain an attempt sending time according to the TA of each round, and circularly send the random access request to the serving base station at the attempt sending time until the 5G terminal successfully accesses the serving base station

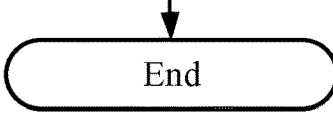

End

FIG. 8

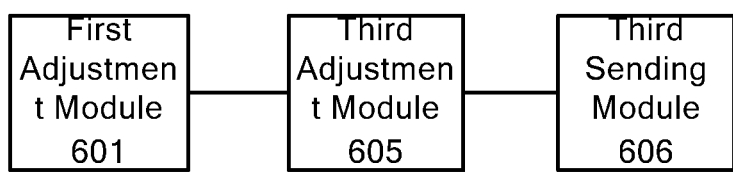

FIG. 9

```
                    ╭─────────────╮
                    │    Start    │
                    ╰──────┬──────╯
                           ▼
┌──────────────────────────────────────────────────┐   S1001
│ In a case where the 5G terminal successfully       │
│ accesses the serving base station and acquires     │
│ the handover instruction, acquire information of   │
│ the serving base station and the target            │
│ base station                                       │
└──────────────────────────┬─────────────────────────┘
                           ▼
┌──────────────────────────────────────────────────┐   S1002
│ Determine an adjustment duration according to the  │
│ information of the serving base station and the    │
│ information of the target base station             │
└──────────────────────────┬─────────────────────────┘
                           ▼
┌──────────────────────────────────────────────────┐   S1003
│ Determine a timing advance maintained by the       │
│ current terminal according to the position         │
│ information of the current terminal and the        │
│ serving base station                               │
└──────────────────────────┬─────────────────────────┘
                           ▼
┌──────────────────────────────────────────────────┐   S1004
│ Determine a TA for initiating random access to the │
│ target base station according to the TA maintained │
│ by the current terminal and the adjustment         │
│ duration                                           │
└──────────────────────────┬─────────────────────────┘
                           ▼
┌──────────────────────────────────────────────────┐   S1005
│ Send a random access request to the target base    │
│ station according to the TA for initiating the     │
│ random access to the target base station           │
└──────────────────────────┬─────────────────────────┘
                           ▼
                    ╭─────────────╮
                    │     End     │
                    ╰─────────────╯
```

FIG. 10

RANDOM ACCESS METHOD AND APPARATUS, AND TERMINAL, ELECTRONIC DEVICE AND COMPUTER-READABLE STORAGE MEDIUM

CROSS-REFERENCE TO RELATED APPLICATIONS

The present application claims the priority of Chinese Patent Application No. 202011545037.4, filed on Dec. 24, 2020, the contents of which are incorporated herein in their entirety by reference.

TECHNICAL FIELD

The present application relates to the field of wireless communication technologies, and in particular, to a random access method, a random access apparatus, a terminal, an electronic device, and a computer-readable storage medium.

BACKGROUND

In a wireless communication system, for example, in a 5th generation mobile communication technology (5G) network or a long term evolution (LTE) network, a random access (RA) technology is an important receiver access control technology, and a receiver of a terminal performs operations such as synchronization and correction for uplink timing, power adjustment of the terminal, and resource request of the terminal through a random access procedure (RAP).

However, in a case where a coverage expectation of a cell exceeds a maximum coverage radius supported by a protocol (or a communication system), if the terminal performs random access according to a normal RAP, it may be possible that the terminal cannot successfully access a base station. If the random access is assisted by information of a global positioning system (GPS), since there is an error between a distance calculated from the information of the GPS and a distance that is actually propagated through by a wireless signal, and in a case where the error is greater than a maximum distance covered by a serving cell where the terminal is located, an access of the terminal may fail; in addition, during a cell handover procedure of the terminal, the access of the terminal may also fail.

SUMMARY

The present application provides a random access method, including: determining a time-adjustment step length according to a physical random access channel (PRACH) format configured for a serving cell where a current terminal is located and a propagation speed of a wireless signal; determining an initial timing advance (TA) according to positioning information acquired from a positioning system; determining a TA according to the time-adjustment step length, a total number of attempt rounds and the initial TA; and initiating at least one round of random access attempt to a base station according to the TA until the current terminal successfully accesses the base station.

The present application provides a random access method, including: determining an adjustment duration according to acquired information of a serving base station and a target base station; determining a timing advance (TA) maintained by a current terminal according to position information of the current terminal and the information of the serving base station; determining a TA for initiating random access to the target base station according to the TA maintained by the current terminal and the adjustment duration; and sending a random access request to the target base station according to the TA for initiating the random access to the target base station.

The present application provides a random access apparatus, including: a time-adjustment step length determination module configured to determine a time-adjustment step length according to a physical random access channel (PRACH) format configured for a serving cell where a current terminal is located and a propagation speed of a wireless signal; an initial timing advance determination module configured to determine an initial timing advance (TA) according to positioning information acquired from a positioning system; a timing advance determination module configured to determine a TA according to the time-adjustment step length, a total number of attempt rounds and the initial TA; and a random access module configured to initiate at least one round of random access attempt to a base station according to the TA until the current terminal successfully accesses the base station.

The present application provides a random access apparatus, including: an adjustment duration determination module configured to determine an adjustment duration according to acquired information of a serving base station and a target base station; a first determination module configured to determine a timing advance (TA) maintained by a current terminal according to position information of the current terminal and the information of the serving base station; a second determination module configured to determine a TA for initiating random access to the target base station according to the TA maintained by the current terminal and the adjustment duration; and a sending module configured to send a random access request to the target base station according to the TA for initiating the random access to the target base station.

The present application provides a terminal, including: the random access apparatus described above.

The present application provides an electronic device, including: at least one processor; a memory having at least one computer program stored thereon, the at least one computer program, executed by the at least one processor, causes the at least one processor to perform the random access method described above.

The present application provides a computer-readable storage medium having a computer program stored thereon, the computer program, executed by a processor, causes the processor to perform the random access method described above.

With respect to the above aspects and other aspects of the present application and implementations thereof, further description is provided in the description of accompanying drawings, detailed implementation and claims.

BRIEF DESCRIPTION OF DRAWINGS

FIG. 1 illustrates a flowchart of a random access method according to the present application.

FIG. 2 illustrates a flowchart of a method for calculating a timing advance according to the present application.

FIG. 6 is a block diagram of a 5G terminal according to the present application.

FIG. 7 is a block diagram of a 5G terminal according to the present application.

FIG. 8 illustrates a flowchart of a random access method during a 5G terminal performing initial random access according to the present application.

FIG. 9 is a block diagram of a 5G terminal according to the present application.

FIG. 10 illustrates a flowchart of a random access method during a 5G terminal preforming cell handover according to the present application.

DETAIL DESCRIPTION OF EMBODIMENTS

Figure 3:
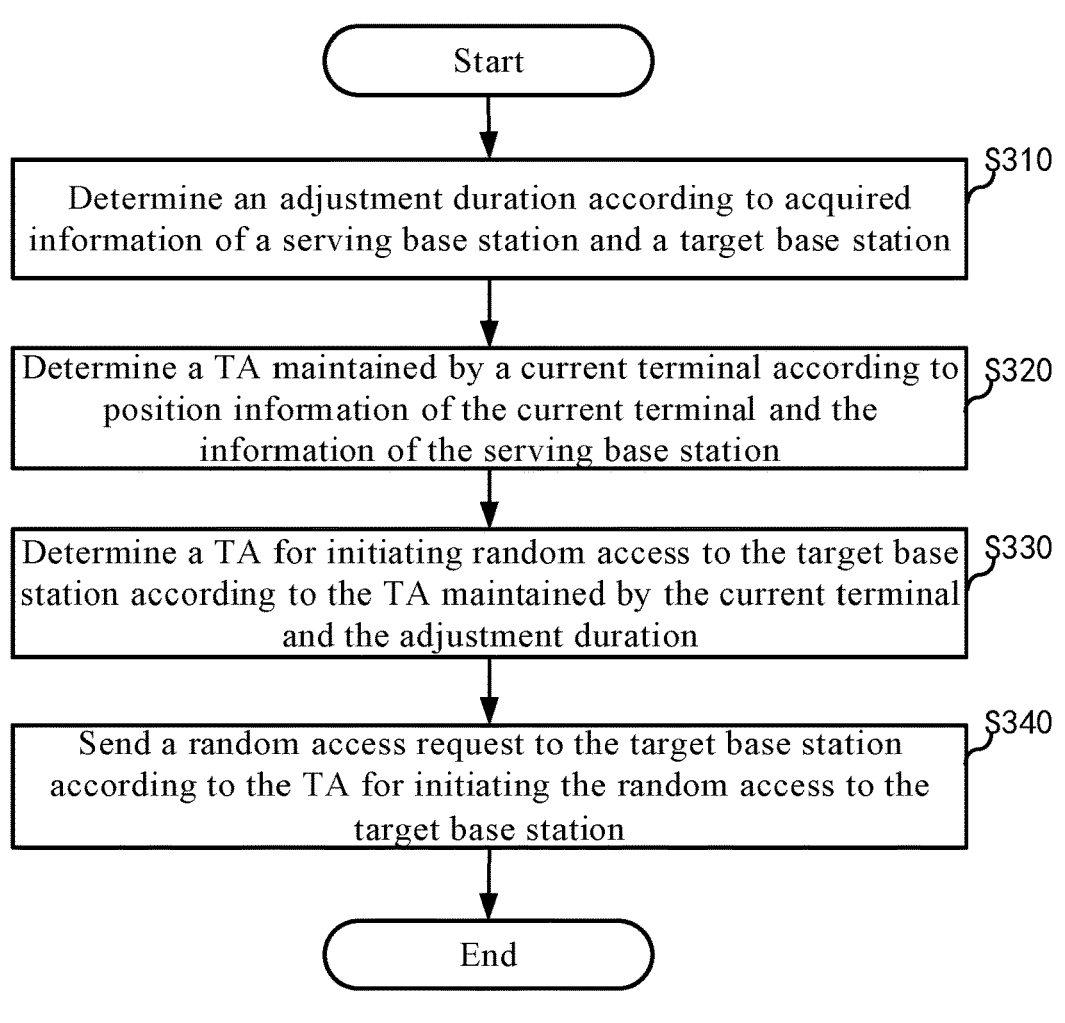
FIG. 3 illustrates a flowchart of a random access method according to the present application.

In order to make purposes, technical solutions, and advantages of the present application clearer, implementations of the present application are described below with reference to the accompanying drawings. It should be noted that the implementations of the present application and characteristics in the implementations may be combined with each other if no conflict is incurred.

A synchronization algorithm commonly used in a communication system includes a constant amplitude zero auto correlation (CAZAC) sequence, and since Zadoff-chu (ZC) sequence in the CAZAC sequence has good autocorrelation and intercorrelation, a physical random access channel (PRACH) in a new radio (NR) in 5th generation mobile communication technology (5G) uses the ZC sequence as an uplink synchronization sequence applied to an uplink synchronization process. Different terminals use different cyclic shifts of a same ZC root sequence to generate PRACH preamble sequences, or use different ZC root sequences to generate the PRACH preamble sequences. It should be noted that the uplink synchronization process includes an uplink synchronization establishment process, an uplink synchronization maintenance process, and an uplink synchronization control process in a handover process; the uplink synchronization establishment process is an initial random access process of a terminal; the uplink synchronization control process in the handover process is a process of the terminal initiating random access to a target base station in a cell handover procedure; the uplink synchronization maintenance process is a process of maintaining a synchronization state between the terminal and a base station after the terminal successfully accesses the base station.

Table 1 shows thirteen different PRACH preamble formats in 5G NR in the present application, the different PRACH preamble formats support different coverage radii of cells as shown in Table 1.

TABLE 1

Coverage Radii of Cells Supported by Different PRACH Preamble Formats

| Preamble Formats | Preamble Size | Subcarrier Spacing of Random Access | Preamble Sequence Length | Cyclic Prefix Length | Coverage Radius (Kilometer) |
|---|---|---|---|---|---|
| 0 | 839 | 1.25 kHz | $24576\kappa$ | $3168\kappa$ | 14 |
| 1 | 839 | 1.25 kHz | $2 * 24576\kappa$ | $21024\kappa$ | 100 |
| 2 | 839 | 1.25 kHz | $4 * 24576\kappa$ | $4688\kappa$ | 22 |
| 3 | 839 | 5 kHz | $4 * 6144\kappa$ | $3168\kappa$ | 14 |
| A1 | 139 | $15 * 2^{\mu}$ kHz | $2 * 2048\kappa * 2^{-\mu}$ | $288\kappa * 2^{-\mu}$ | $0.94 * 2^{-\mu}$ |
| A2 | 139 | $15 * 2^{\mu}$ kHz | $4 * 2048\kappa * 2^{-\mu}$ | $576\kappa * 2^{-\mu}$ | $2.11 * 2^{-\mu}$ |
| A3 | 139 | $15 * 2^{\mu}$ kHz | $6 * 2048\kappa * 2^{-\mu}$ | $864\kappa * 2^{-\mu}$ | $3.52 * 2^{-\mu}$ |
| B1 | 139 | $15 * 2^{\mu}$ kHz | $2 * 2048\kappa * 2^{-\mu}$ | $216\kappa * 2^{-\mu}$ | $0.47 * 2^{-\mu}$ |
| B2 | 139 | $15 * 2^{\mu}$ kHz | $4 * 2048\kappa * 2^{-\mu}$ | $360\kappa * 2^{-\mu}$ | $1.06 * 2^{-\mu}$ |
| B3 | 139 | $15 * 2^{\mu}$ kHz | $6 * 2048\kappa * 2^{-\mu}$ | $504\kappa * 2^{-\mu}$ | $1.76 * 2^{-\mu}$ |
| B4 | 139 | $15 * 2^{\mu}$ kHz | $12 * 2048\kappa * 2^{-\mu}$ | $936\kappa * 2^{-\mu}$ | $3.87 * 2^{-\mu}$ |
| C0 | 139 | $15 * 2^{\mu}$ kHz | $2048\kappa * 2^{-\mu}$ | $1240\kappa * 2^{-\mu}$ | $5.3 * 2^{-\mu}$ |
| C2 | 139 | $15 * 2^{\mu}$ kHz | $4 * 2048\kappa * 2^{-\mu}$ | $2048\kappa * 2^{-\mu}$ | $9.3 * 2^{-\mu}$ |

In the table above, $\kappa = 64$, $\mu \in [0, 1, 2, 3, 4]$.

As shown in Table 1, a maximum coverage range of the PRACH format supported by a 5G NR system is one hundred kilometers. However, for an ultra-far coverage scenario such as an air route, a coverage expectation is far greater than one hundred kilometers, and may even reach three hundred kilometers, so that the 5G NR system cannot meet the coverage expectation, and in a case where a coverage expectation of a cell exceeds a maximum coverage radius supported by a protocol (or a communication system), if the terminal performs random access according to a normal RAP, it may be possible that the terminal cannot successfully access a base station. If the random access is assisted by information of a global positioning system (GPS), since there is an error between a distance calculated from the information of the GPS and a distance that is actually propagated through by a wireless signal, and in a case where the error is greater than a maximum distance covered by a serving cell where the terminal is located, an access of the terminal may fail; in addition, during a cell handover procedure of the terminal, the access of the terminal may also fail.

FIG. 1 illustrates a flowchart of a random access method according to the present application. The random access method may be applied to a random access apparatus, and may be applied to a terminal. As shown in FIG. 1, the random access method provided in the present application may include following operations S110 to S140.

At operation S110, determining a time-adjustment step length according to a PRACH format configured for a serving cell where a current terminal is located and a propagation speed of a wireless signal.

It should be noted that, coverage ranges of serving cells corresponding to different PRACH formats are different, and each serving cell may be configured with different PRACH formats as desired, so as to adapt to different application environments.

In some implementations, the determining a time-adjustment step length according to a PRACH format configured for a serving cell where a current terminal is located and a propagation speed of a wireless signal includes: determining a coverage radius of the serving cell according to the PRACH format; determining a preset threshold of the time-adjustment step length according to the coverage radius of the serving cell and the propagation speed of the wireless signal; and determining the time-adjustment step length according to the preset threshold of the time-adjustment step length, the time-adjustment step length being greater than or equal to zero, and less than or equal to the preset threshold of the time-adjustment step length.

For example, the coverage radius of the serving cell corresponding to the PRACH format may be obtained by looking up the PRACH format configured for the serving cell from Table 1. For example, the PRACH format configured for the serving cell is 1, and by querying Table 1, it can be known that a corresponding preamble size is 839, the maximum coverage radius supported by the serving cell is one hundred kilometers, and the propagation speed of the wireless signal may be a speed of light (i.e., about 300000 kilometers per second), and then the time-adjustment step length is obtained through calculation. It should be noted that, according to configuration information, the coverage radius of the serving cell at present may be set to a value greater than or equal to zero, and less than or equal to one hundred kilometers.

At operation S120, determining an initial timing advance (TA) according to positioning information acquired from a positioning system.

The positioning system may be a global positioning system (GPS), or any one or more positioning systems of a Beidou navigation satellite system, a Galileo satellite navigation system, or a global orbiting navigation satellite system, different positioning systems obtain different positioning information, but the positioning information may include positions of the current terminal and a serving base station. Based on information of above positions, relative position information between the current terminal and the serving base station is calculated, and then the initial timing advance is obtained through calculation, so as to ensure an accuracy of the initial timing advance.

It should be noted that, the above positioning systems are only examples, and other positioning systems not described herein are also within the protection scope of the present application, and may be specifically set according to specific situations, but are not repeated herein.

In some implementations, the determining an initial timing advance according to positioning information acquired from a positioning system includes: acquiring a real distance between the current terminal and the base station from the positioning system; and in a case where the real distance is determined to be greater than a preset distance threshold, determining the initial TA according to the real distance and the propagation speed of the wireless signal.

Through the positioning information acquired from the positioning system, the position of the current terminal and the real distance between the current terminal and the base station corresponding to the serving cell can be more accurately obtained; then, according to the PRACH format configured for the serving cell where the current terminal is located, the maximum coverage radius of the serving cell can be determined, and the initial timing advance can be more accurately obtained through calculation according to the maximum coverage radius, the real distance and the propagation speed of the wireless signal.

It should be noted that, in a case where the real distance between the current terminal and the base station corresponding to the serving cell is determined to be greater than the preset distance threshold (e.g., a preset coverage radius of the cell), it indicates that the current terminal is located in an edge zone of a coverage area of the serving base station, or the current terminal is located farther away from the serving base station (for example, the current terminal is located three hundred kilometers away from the serving base station, and a maximum coverage radius configured for a cell in the serving base station is one hundred kilometers). Since the quality of a communication signal of the serving base station received by the current terminal may be poor, by calculating the initial timing advance according to the maximum coverage radius, the real distance and the propagation speed of the wireless signal, an influence of a distance error on a success rate of the terminal randomly accessing the serving base station can be reduced, the distance error being a difference between a distance calculated from the positioning information and a real propagation distance of the wireless signal, so that a high-precision adjustment on the current terminal is facilitated to be performed, and a preparation for subsequently sending a random access request is made.

At operation S130, determining a TA according to the time-adjustment step length, the number of attempt rounds and the initial TA.

The TA is a parameter for indicating a timing offset of an eNodeB receiving data transmitted by a terminal, and a physical meaning of the TA is a round-trip delay between the terminal and the eNodeB. The PRACH is an access channel for transmitting a random access request and a data packet during a terminal initially initiates random access.

The TA determined according to the time-adjustment step length, the number of the attempt rounds and the initial TA is more accurate, ensuring that the random access request sent by the current terminal can be successfully received by the serving base station and improving a success rate of the current terminal accessing the serving base station. If the serving base station receives the random access request, the serving base station determines whether any idle resource is available at a current time point for processing the random access request of the current terminal, and in response to that the serving base station has the idle resource, the serving base station responds to the current terminal, so that the current terminal successfully accesses the serving base station.

At operation S140, initiating at least one round of random access attempt to a base station according to the TA until the current terminal successfully accesses the base station.

With the accurate TA obtained in operation S130, during sending the random access request to the base station, even if the coverage expectation of the cell exceeds the maximum coverage radius (e.g., one hundred kilometers) supported by the protocol, the current terminal can still accurately send the random access request to the base station according to the TA, thereby improving a probability of successfully accessing the base station.

In the present application, the time-adjustment step length is determined according to the PRACH format configured for the serving cell where the current terminal is located and the propagation speed of the wireless signal, so that an accuracy of time-adjustment is ensured; the initial TA is determined according to the positioning information acquired from the positioning system, and thus the TA is initialized; then the TA is determined according to the time-adjustment step length, the number of the attempt rounds and the initial TA, the TA can be more accurate, so that in the case where the coverage expectation of the cell exceeds the maximum coverage radius supported by the protocol (or, a communication system), it can also ensure that the random access request can be accurately sent to the base station according to the TA, and the current terminal can successfully access the base station, a condition that the access of the current terminal fails is avoided, the success rate of the random access of the terminal is improved, and the user experience is improved.

FIG. 2 illustrates a flowchart of a method for calculating a timing advance according to the present application. As shown in FIG. 2, in some implementations, the determining a TA according to the time-adjustment step length, the number of attempt rounds and the initial TA in the operation S130 may be implemented by following operations S131 to S134.

At operation S131, determining a TA of a current round according to the time-adjustment step length, the number of attempt rounds in the current round and the initial TA.

The number of the attempt rounds in the current round may be one, or may be an integer greater than one, so that the TA determined in the current round can be ensured to be more accurate, a sending time of the terminal sending the random access request to the serving base station according to the TA in the current round is closer to a processing time window of the serving base station, the serving base station can be ensured to process the random access request more quickly, and the success rate of the random access is improved.

In some implementations, the determining a TA of a current round according to the time-adjustment step length, the number of attempt rounds in the current round and the initial TA includes: during performing a first round of random access attempt, setting the time-adjustment step length to be zero, and determining the initial TA as a TA of the first round of random access attempt.

The initial TA is a TA obtained through calculation according to the real distance and the propagation speed of the wireless signal in a case where the real distance is determined to be greater than the preset distance threshold, by determining the initial TA as the TA of the first round of random access attempt, and sending circularly the random access request to the serving base station for multiple times according to the initial TA, the serving base station can be ensured to successfully receive the random access request sent by the current terminal, and the success rate of the current terminal randomly accessing the serving base station is improved.

At operation S132, sending circularly a random access request to the base station according to the TA of the current round.

The number of random access attempts in any round is the same, according to different TAs of each round, at least one round of random access attempt is initiated to the base station, so that a speed of the current terminal accessing the base station is increased, the current terminal can access the base station as soon as possible, and the accuracy of the random access is improved.

For example, during each round of random access attempt, K times of random access requests may be sent to the base station to enable the current terminal to access the base station as soon as possible, K being an integer greater than or equal to 1.

At operation S133, in a case where a random access of the current round is determined to be failed, updating the number of attempt rounds.

It should be noted that, if the current terminal is in a state in which the random access fails and the current terminal still cannot successfully access the serving base station through multiple attempts, it indicates that the current terminal may be too far away from the serving base station or may miss a processing window period of the serving base station, and the number of attempt rounds is expected to be updated to enter a next round of random access attempt, so as to ensure that the serving base station can successfully receive the random access request sent by the current terminal.

At operation S134, determining a TA of a next round according to the time-adjustment step length, the updated number of attempt rounds and the initial TA. The time-adjustment step length can be obtained through calculation according to a preset threshold of the coverage radius of the serving cell and the propagation speed of the wireless signal. For example, by querying Table 1, if the preset threshold of the coverage radius of the serving cell is twenty-two kilometers, the time-adjustment step length is obtained through calculation according to the twenty-two kilometers and the propagation speed of the wireless signal, so that the time-adjustment step length can meet the coverage range of the serving cell, the accuracy of subsequent adjustment on the sending time of the random access request is ensured.

In some implementations, the TA for each round is calculated by a following formula: $TA_N=TA_0\pm(N-1)*\Delta_{TA}$, $TA_0$ represents the initial TA, N represents the number of attempt rounds, N is an integer greater than or equal to 1, $\Delta_{TA}$ represents the time-adjustment step length, and $TA_N$ represents the TA for an N-th round.

In a case where N equals to 1, the TA for a first round is represented as: $TA_1=TA_0$; in a case where N equals to 2, the TA for a second round is represented as: $TA_2=TA_0\pm\Delta_{TA}$; in a case where N equals to 3, the TA for a third round is represented as: $TA_3=TA_0\pm2*\Delta_{TA}$; . . . ; the TA for the N-th round is represented as: $TA_N=TA_0\pm(N-1)*\Delta_{TA}$ By taking $\Delta_{TA}$ as the time-adjustment step length, the precision of the TA of each round is dynamically adjusted, so that the current terminal can expand an attempt range, the adjustment on the sending time for sending the random access request is accelerated, the current terminal can quickly access the serving base station, and the efficiency of the random access is improved.

Through a plurality rounds of random access attempts, and after each attempt round of sending the random access request is complete, the number of the attempt rounds is updated, and according to the time-adjustment step length, the updated number of the attempt rounds and the initial TA, the TA of the next round is calculated, so that the TA of the next round can be ensured to be more accurate, and the probability of the current terminal successfully accessing the serving base station is improved.

In the present application, at least one round of random access attempt is initiated to the serving base station through different TAs, so that the serving base station can be ensured to successfully receive the random access request sent by the current terminal, and in a case where the current terminal is far away from the serving base station, the current terminal still can be ensured to successfully access the serving base station, a condition that the access of the current terminal fails is avoided, the success rate of the random access of the terminal is improved, and the user experience is improved.

FIG. 3 illustrates a flowchart of a random access method according to the present application. The random access method may be applied to a random access apparatus or a terminal. As shown in FIG. 3, the random access method provided in the present application may include following operations S310 to S340.

At operation S310, determining an adjustment duration according to acquired information of a serving base station and a target base station.

In some implementations, the determining an adjustment duration according to acquired information of a serving base station and a target base station in operation S310 includes: extracting a first distance from the information of the serving base station, the first distance being a distance measured in real time between the current terminal and the serving base station; extracting a second distance from the information of the target base station, the second distance being a distance measured in real time between the current terminal and the target base station; and determining the adjustment duration according to the first distance, the second distance and the propagation speed of the wireless signal.

For example, the first distance and the second distance are both distances obtained by a real-time measurement according to positioning information from the Beidou satellite navigation system, so that the accuracy of the first distance and the second distance are guaranteed. The adjustment duration is obtained through calculating according to a following formula: the adjustment duration=(the second distance−the first distance)/the propagation speed of the wireless signal, the accuracy of the adjustment duration is guaranteed, so that the current terminal can be switched to the target base station more quickly and accurately, a user can quickly obtain a communication service provided by the target base station, and the user experience is improved.

In some implementations, the determining an adjustment duration according to acquired information of a serving base station and a target base station in operation S310 includes: extracting frame header information of a current downlink signal from the information of the serving base station; extracting frame header information of a target downlink signal from the information of the target base station; and determining the adjustment duration according to the frame header information of the current downlink signal and the frame header information of the target downlink signal.

It should be noted that frame header information includes a start time of a downlink sub-frame, and according to a start time of the current downlink signal and a start time of the target downlink signal, the adjustment duration can be obtained through calculation, so as to ensure that the adjustment duration is more accurate and ensure the accuracy of the sending time of a subsequent random access request.

In some implementations, the determining an adjustment duration according to acquired information of a serving base station and a target base station in operation S310 includes: according to pre-stored position information of the serving base station and the target base station, determining a third distance between the serving base station and the target base station; and determining the adjustment duration according to the third distance and the propagation speed of the wireless signal.

For example, pre-stored longitude and latitude information of the serving base station and the target base station are respectively extracted from the communication system, and the third distance between the serving base station and the target base station, is obtained through calculation according to the longitude and latitude information, which not only ensures the accuracy of the third distance, but also accelerates a calculation speed for the adjustment duration, a calculation speed of calculating the sending time of the subsequent random access request is also accelerated, a user can switch to the target base station more quickly and accurately, and the quality of a communication service for the current terminal is ensured.

At operation S320, determining a TA maintained by a current terminal according to position information of the current terminal and the information of the serving base station.

The TA maintained by the current terminal is determined according to a real distance between the current terminal and the serving base station and the propagation speed of the wireless signal.

It should be noted that, after the current terminal successfully accesses the serving base station and before the current terminal receives a handover request, the current terminal may move, possibly exceed a coverage area of a cell corresponding to the serving base station, and enter a coverage area of a cell corresponding to the target base station. In such case, the current terminal may receive a handover instruction to enable the current terminal to switch to the target base station, so that the target base station can provide a better communication service for the current terminal. Therefore, if the timing advance maintained by the current terminal is the timing advance determined according to the real distance from the current terminal to the serving base station and the propagation speed of the wireless signal, in the cell handover procedure, the current terminal can quickly initiate random access to the target base station, a handover speed of the current terminal is accelerated, the current terminal can obtain a better communication service, and the quality of a user service is improved.

At operation S330, determining a TA for initiating random access to the target base station according to the TA maintained by the current terminal and the adjustment duration.

The adjustment duration may be obtained through different implementations in operation S310, so that the adjustment duration is more accurate, and further, the accuracy of the TA for initiating the random access to the target base station is improved.

For example, a difference between the TA maintained by the current terminal and the adjustment duration is calculated, and the TA for initiating the random access to the target base station is determined according to the difference, so that the accuracy of the TA for the terminal performing cell handover is improved.

At operation S340, sending a random access request to the target base station according to the TA for initiating the random access to the target base station.

According to the TA for initiating the random access to the target base station, the sending time for actually sending the random access request to the target base station can be obtained through calculation, and the random access request is sent to the target base station at the sending time, so that a time at which the target base station receives the random access request sent by the current terminal is closer to the processing window period of the target base station, the target base station can be ensured to quickly process the random access request sent by the current terminal, the success rate of the random access is improved, and further, the current terminal can be switched to the target base station as soon as possible, and the user experience is improved.

In the present application, the adjustment duration can be determined, according to the acquired information of the serving base station and the target base station, through different calculation manners, the accuracy of the adjustment duration is guaranteed; the TA maintained by the current terminal is determined according to the position information of the current terminal and the serving base station, and by referring to the TA maintained by the current terminal and the adjustment duration, the TA for initiating the random access to the target base station is determined; according to the TA for initiating the random access to the target base station, the random access request is sent to the target base station, the current terminal can be ensured to be quickly switched to the target base station, the quality of communication service for the current terminal is guaranteed, and the user experience is improved.

Figure 4:
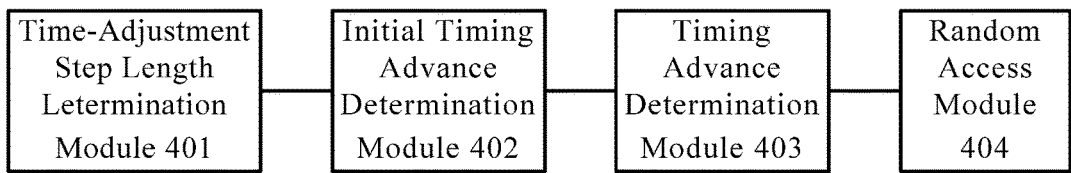
FIG. 4 is a block diagram of a random access apparatus according to the present application.

A random access apparatus provided in the present application is described in detail below with reference to the accompanying drawings. FIG. 4 is a block diagram of a random access apparatus according to the present application. As shown in FIG. 4, the random access apparatus may include a time-adjustment step length determination module 401, an initial timing advance determination module 402, a timing advance determination module 403, and a random access module 404.

The time-adjustment step length determination module 401 is configured to determine a time-adjustment step length according to a PRACH format configured for a serving cell where a current terminal is located and a propagation speed of a wireless signal; the initial timing advance determination module 402 is configured to determine an initial TA according to positioning information acquired from a positioning system; the timing advance determination module 403 is configured to determine a TA according to the time-adjustment step length, the number of attempt rounds and the initial TA; and the random access module 404 is configured to initiate at least one round of random access attempt to a base station according to the TA until the current terminal successfully accesses the base station.

In some implementations, the timing advance determination module 403 may include a first determination sub-module, a sending sub-module, an update sub-module, and a second determination sub-module.

The first determination sub-module is configured to determine a TA of a current round according to the time-adjustment step length, the number of attempt rounds in the current round and the initial TA; the sending sub-module is configured to send circularly a random access request to the base station according to the TA of the current round; the update sub-module is configured to, in a case where a random access of the current round is determined to be failed, update the number of attempt rounds; and the second determination sub-module is configured to determine a TA of a next round according to the time-adjustment step length, the updated number of attempt rounds and the initial TA.

In some implementations, the first determination sub-module may include an initial determination module.

The initial determination module is configured to, during performing a first round of random access attempt, set the time-adjustment step length to be zero, and determine the initial TA as a TA of the first round of random access attempt.

In some implementations, the time-adjustment step length determination module 401 may include a coverage radius determination sub-module, a step length threshold determination sub-module, and a time-adjustment step length determination sub-module.

The coverage radius determination sub-module is configured to determine a coverage radius of the serving cell according to the PRACH format; the step threshold determination sub-module is configured to determine a preset threshold of the time-adjustment step length according to the coverage radius of the serving cell and the propagation speed of the wireless signal; and the time-adjustment step length determination sub-module is configured to determine the time-adjustment step length according to the preset threshold of the time-adjustment step length, the time-adjustment step length being greater than or equal to zero, and less than or equal to the preset threshold of the time-adjustment step length.

In some implementations, the initial timing advance determination module 402 may include an acquisition sub-module and an initial timing advance determination sub-module.

The acquisition sub-module is configured to acquire a real distance between the current terminal and the base station from the positioning system; and the initial timing advance determination sub-module is configured to, in a case where the real distance is determined to be greater than a preset distance threshold, determine the initial TA according to the real distance and the propagation speed of the wireless signal.

In the random access apparatus provided in the present application, the time-adjustment step length determination module 401 determines the time-adjustment step length according to the PRACH format configured for the serving cell where the current terminal is located and the propagation speed of the wireless signal, the accuracy of time-adjustment is ensured; the initial timing advance determination module 402 determines the initial TA according to the positioning information acquired from the positioning system, and initializes the TA; the timing advance determination module 403 determines the TA according to the time-adjustment step length, the number of the attempt rounds and the initial TA, the TA can be more accurate, so that, in the case where the coverage expectation of the cell exceeds the maximum coverage radius supported by the protocol (or, a communication system), the random access module 404 can send the random access request accurately to the base station according to the TA, and the current terminal can successfully access the base station, a condition that the access of the current terminal fails is avoided, the success rate of the random access of the terminal is improved, and the user experience is improved.

Figure 5:
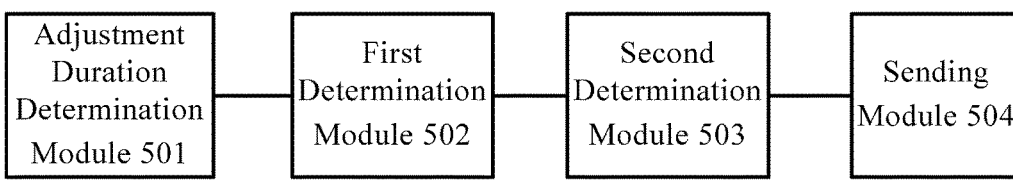
FIG. 5 is a block diagram of a random access apparatus according to the present application.

FIG. 5 is a block diagram of a random access apparatus according to the present application. As shown in FIG. 5, the random access apparatus may include an adjustment duration determination module 501, a first determination module 502, a second determination module 503, and a sending module 504.

The adjustment duration determination module 501 is configured to determine an adjustment duration according to acquired information of a serving base station and a target base station; the first determination module 502 is configured to determine a timing advance maintained by a current terminal according to position information of the current terminal and the information of the serving base station; the second determination module 503 is configured to determine a TA for initiating random access to the target base station according to the TA maintained by the current terminal and the adjustment duration; and the sending module 504 is configured to send a random access request to the target base station according to the TA for initiating the random access to the target base station.

In some implementations, the adjustment duration determination module 501 may include a first extraction sub-module, a second extraction sub-module, and a first adjustment sub-module.

The first extraction sub-module is configured to extract a first distance from the information of the serving base station, the first distance being a distance measured in real time between the current terminal and the serving base station; the second extraction sub-module is configured to extract a second distance from the information of the target base station, the second distance being a distance measured in real time between the current terminal and the target base station; and the first adjustment sub-module is configured to determine the adjustment duration according to the first distance, the second distance and the propagation speed of the wireless signal.

In some implementations, the adjustment duration determination module 501 may include a third extraction sub-module, a fourth extraction sub-module, and a second adjustment sub-module.

The third extraction sub-module is configured to extract frame header information of a current downlink signal from the information of the serving base station; the fourth extraction sub-module is configured to extract frame header information of a target downlink signal from the information of the target base station; and the second adjustment sub-module is configured to determine the adjustment duration according to the frame header information of the current downlink signal and the frame header information of the target downlink signal.

In some implementations, the adjustment duration determination module 501 may include a distance determination sub-module and a third adjustment sub-module.

The distance determination sub-module is configured to, according to pre-stored position information of the serving base station and the target base station, determine a third distance between the serving base station and the target base station; and the third adjustment sub-module is configured to determine the adjustment duration according to the third distance and the propagation speed of the wireless signal.

In the random access apparatus provided in the present application, the adjustment duration determination module 501 determines the adjustment duration according to the acquired information of the serving base station and the target base station, the accuracy of the adjustment duration is guaranteed; the first determination module 502 determines the TA maintained by the current terminal according to the position information of the current terminal and the serving base station, and the second determination module 503 determines the TA for initiating random access to the target base station according to the TA maintained by the current terminal and the adjustment duration; the sending module 504, according to the TA for initiating the random access to the target base station, sends the random access request to the target base station, the current terminal can be ensured to be quickly switched to the target base station, the quality of communication service for the current terminal is guaranteed, and the user experience is improved.

In some implementations, the random access method provided in the present application may also be applied to a terminal including the random access apparatus shown in FIG. 4 or FIG. 5.

It should be understood that the terminal provided in the present application is not limited to the random access apparatus described above and shown in the accompanying drawings. For convenience and simplicity of description, detailed description of known methods is omitted in the present application, specific working processes of the module and the apparatus described above may refer to corresponding processes of the above method, which are not repeated here.

The terminal may determine the TA through different random access apparatuses, so that the TA is more accurate; in a case where a coverage expectation of a cell exceeds a maximum coverage radius supported by a protocol (or a communication system), the current terminal can still be ensured to accurately send the random access request to the base station according to the TA and thus can successfully access the base station, a condition that the access of the current terminal fails is avoided, the success rate of the random access of the terminal is improved, and the user experience is improved.

FIG. 6 is a block diagram of a 5G terminal according to the present application. As shown in FIG. 6, the 5G terminal may include a first adjustment module 601 and a first sending module 602.

The first adjustment module 601 is configured to, according to a PRACH format configured for a serving cell where the 5G terminal is located, information of a base station and the 5G terminal in GPS information, calculate to obtain a timing advance for sending a random access request to a 5G base station.

The first sending module 602 is configured to send the random access request multiple times to the 5G base station according to the timing advance.

In the 5G terminal, according to the PRACH format configured for the serving cell where the 5G terminal is located, the information of the base station and the 5G terminal in the GPS information, the timing advance for sending the random access request to the 5G base station is obtained through calculation, so that the timing advance can be more accurate; random accesses are initiated multiple times to the 5G base station according to the timing advance, so that the 5G terminal at an edge of a network can be ensured to successfully access the 5G network, the success rate of the random access of the terminal is improved, and the user experience is improved.

FIG. 7 is a block diagram of a 5G terminal according to the present application. As shown in FIG. 7, the 5G terminal may include a first adjustment module 601, a second adjustment module 603, and a second sending module 604.

The first adjustment module 601 is configured to, according to a PRACH format configured for a serving cell where the 5G terminal is located, information of a base station and the 5G terminal in GPS information, calculate to obtain a timing advance for sending a random access request to a 5G base station.

The second adjustment module 603 is configured to initiate random access to the base station according to the timing advance; count the number of attempts to send the random access requests; in a case where the number of attempts is determined to be greater than a preset sending number, and the 5G terminal is in a state in which the random access fails, determine a timing advance of a current round according to the time-adjustment step length, the number of attempt rounds of the current round and the initial timing advance; according to the TA of the current round, circularly send a random access request to the base station; in a case where the random access of the current round is determined to be failed, update the number of attempt rounds; and determine the TA of a next round according to the time-adjustment step length, the updated number of attempt rounds and the initial timing advance.

The second sending module 604 is configured to circularly send the random access request to the base station according to the TA of the next round until the current terminal successfully accesses the base station.

For example, the TA for the N-th round is calculated by a following formula: $TA_N = TA_0 \pm (N-1) * \Delta_{TA}$, $TA_0$ represents the initial TA, N represents the number of attempt rounds, N is an integer greater than or equal to 1, $\Delta_{T4}$ represents the time-adjustment step length, and $TA_N$ represents the TA for N-th round.

It should be noted that, in an attempt process of the N-th round, the random access request is sent to the serving base station according to the TA in the round, the time-adjustment step length $\Delta_{T4}$ may be a time-adjustment amount obtained through calculation according to a maximum coverage radius corresponding to the PRACH format configured for a serving cell where the 5G terminal is located and a propagation speed of a wireless signal, so that the terminal located at an edge of the cell can quickly adjust an attempt sending time of the random access request by taking the maximum coverage radius as the step length, so as to access the serving base station more quickly, thereby improving the user experience.

FIG. 8 illustrates a flowchart of a random access method during a 5G terminal performing initial random access according to the present application. The random access method may be applied to a procedure for the 5G terminal performing initial random access to the serving base station in ultra-long distance coverage scenes such as an air route. As shown in FIG. 8, the procedure for the 5G terminal performing initial random access may be implemented by following operations S801 to S804.

At operation S801, according to a PRACH format configured for a serving cell where the 5G terminal is located, information of a 5G base station and the 5G terminal in GPS information, calculating to obtain a timing advance for sending a random access request to the 5G base station.

In some implementations, the timing advance may be obtained through calculation by adopting following manners: firstly, according to the information of the 5G terminal and the 5G base station, a real distance between the 5G terminal and the 5G base station is obtained through calculation; in a case where the real distance is determined to exceed a coverage radius corresponding to a PRACH format configured for the serving cell, a time-adjustment step length Tp0 is obtained through calculation according to the real distance and a propagation speed of a wireless signal; according to a maximum coverage radius R supported by the PRACH format configured for the serving cell and the propagation speed v of the wireless signal, an initial timing advance Tcell (for example, Tcell is R/v) is obtained through calculation, and then a timing advance Tpm of the 5G terminal for sending a random access request is obtained through calculation according a formula Tpm=2*(Tp0−Tp1), and the random access request is sent to the 5G base station according to the timing advance Tpm.

It should be noted that 0≤Tp1≤Tcell, Tp1 may be different time-adjustment amounts set according to coverage radii of cells corresponding to different PRACH formats and the propagation speed of the wireless signal; or may be a unified time-adjustment amount set by referring to the coverage radii of the cells corresponding to different PRACH formats and the propagation speed of the wireless signal.

At operation S802, counting the number of attempts to send the random access request according to the timing advance.

At operation S803, in a case where the number of the attempts is determined to be greater than a preset sending number, and the 5G terminal is in a state in which the random access fails, entering a procedure of N rounds of random access attempts.

For example, the preset sending number is set to be preambleTransMax (e.g., preambleTrunsMax is equal to 5 or 10), within the timing advance Tpm, in a case where the number of attempts of the 5G terminal sending the random access request is greater than preambleTrunsMax, and the 5G terminal is still in the state in which the random access fails, the procedure of N rounds of random access attempts is expected to be performed, and the maximum number of attempt rounds is $N_{ma)}$.

In some implementations, a TA of a current round is determined according to the time-adjustment step length, the number of attempt rounds in the current round and the initial TA; a random access request is sent circularly to the base station according to the TA of the current round; in a case where a random access of the current round is determined to be failed, the number of attempt rounds is updated; and a TA of a next round is determined according to the time-adjustment step length, the updated number of attempt rounds and the initial TA.

The time-adjustment step length is set to be $\Delta_{T4}$, which is a time-adjustment amount obtained through calculation according to the maximum coverage radius R supported by the PRACH format configured for a current serving cell and the propagation speed v of the wireless signal. During each round of random access attempt, K times of random access requests may be sent to the 5G base station, K is an integer greater than or equal to 1, and the TA in each round may be calculated by a following formula: $TA_N=TA_0\pm(N-1)*\Delta_{T4}$, $TA_0$ represents the initial TA, N represents the number of attempt rounds, N is an integer greater than or equal to 1, $\Delta_{T4}$ represents the time-adjustment step length, and $TA_N$ represents a TA for the N-th round.

In a case where N equals to 1, a TA for a first round is represented as: $TA_1=TA_0$; in a case where N equals to 2, a TA for a second round is represented as: $TA_2=TA_0\pm\Delta_{T4}$; in a case where N equals to 3, a TA for a third round is represented as: $TA_3=TA_0\pm2*\Delta_{T4}$; . . . ; a TA for the N-th round is represented as: $TA_N=TA_0\pm(N-1)*\Delta_{T4}$, so as to ensure that the TA in each round is more accurate, and probability of the current terminal successful accessing the serving base station is improved.

At operation S804, calculating to obtain an attempt sending time according to the TA of each round, and circularly sending the random access request to the serving base station at the attempt sending time until the 5G terminal successfully accesses the serving base station.

In the present application, a problem that a maximum coverage length of a PRACH format supported in a 5G NR system can only cover a preset length is solved, a coverage range of the cell corresponding to the 5G base station is expanded, the success rate of the random access of the 5G terminal can be improved through N attempt rounds, a condition that the access of the current terminal fails is avoided, the success rate of the random access of the terminal is improved, and the user experience is improved.

FIG. 9 is a block diagram of a 5G terminal according to the present application. As shown in FIG. 9, the 5G terminal may include a first adjustment module 601, a third adjustment module 605, and a third sending module 606.

The first adjustment module 601 is configured to, according to a PRACH format configured for a serving cell where the 5G terminal is located, information of a base station and the 5G terminal in GPS information, calculate to obtain a timing advance for sending a random access request to a 5G base station.

The third adjustment module 605 is configured to calculate to obtain a first sending time of the random access request according to the timing advance, send the random access request to the serving base station according to the first sending time, and successfully access the serving base station; in a case where the 5G terminal receives a handover instruction, respectively calculate a first distance from the 5G terminal to a serving cell and a second distance from the 5G terminal to a target cell, and calculate to obtain an adjustment duration according to the first distance, the second distance and a propagation speed of a wireless signal; and determine a second sending time according to the first sending time and the adjustment duration.

The third sending module 606 is configured to send the random access request to the target base station corresponding to the target cell at the second sending time until the 5G terminal is successfully switched to the target base station.

FIG. 10 illustrates a flowchart of a random access method during a 5G terminal preforming a cell handover according to the present application. The random access method may be applied to a scene in which a 5G terminal successfully accesses a serving base station but receives a handover instruction sent from the serving base station, and the 5G terminal is expected to be switched to a target base station. As shown in FIG. 10, a random access procedure of the terminal performing the cell handover can be implemented by following operations S1001 to S1005.

At operation S1001, in a case where the 5G terminal successfully accesses the serving base station and acquires the handover instruction, acquiring information of the serving base station and the target base station.

At operation S1002, determining an adjustment duration according to the information of the serving base station and the information of the target base station.

In some implementations, the adjustment duration may be calculated by following manners: extracting a first distance from the information of the serving base station, the first distance being a distance measured in real time between the 5G terminal and the serving base station; extracting a second distance from the information of the target base station, the second distance being a distance measured in real time between the 5G terminal and the target base station; and determining the adjustment duration according to the first distance, the second distance and the propagation speed of the wireless signal.

For example, the first distance and the second distance are both obtained by performing measurement in real time according to positioning information in the GPS information, and the accuracy of the first distance and the second distance are guaranteed. The adjustment duration is obtained according to a following formula: the adjustment duration= (the second distance–the first distance)/the propagation speed of the wireless signal, the accuracy of the adjustment duration is guaranteed, the current terminal can be switched to the target base station more quickly and accurately, a user can quickly obtain a communication service provided by the target base station, and the user experience is improved.

In some implementations, the adjustment duration may be calculated by followings: extracting frame header information of a current downlink signal from the information of the serving base station; extracting frame header information of a target downlink signal from the information of the target base station; and determining the adjustment duration according to the frame header information of the current downlink signal and the frame header information of the target downlink signal.

For example, a first frame header time in the frame header information of the current downlink signal is extracted, a second frame header time in the frame header information of the target downlink signal is extracted, the adjustment duration equals to the first frame header time minus the second frame header time. By taking each data frame as a unit, the adjustment duration is obtained through calculation, the precision of the adjustment duration is improved, and the accuracy of the sending time of the subsequent random access request is ensured.

In some implementations, the adjustment duration may be calculated by followings: according to pre-stored position information of the serving base station and the target base station, determining a third distance between the serving base station and the target base station; and determining the adjustment duration according to the third distance and the propagation speed of the wireless signal.

It should be noted that the third distance is a distance determined according to the pre-stored positioning information of the serving base station and the target base station, for example, during establishing the serving base station, latitude and longitude information corresponding to the serving base station may be recorded into the communication system, similarly, during establishing the target base station, latitude and longitude information corresponding to the target base station may be recorded into the communication system, and for calculating the adjustment duration, the latitude and longitude information of such two base stations described above may be directly extracted from the communication system, so that the positioning information of the two base stations can be obtained, and then the third distance is obtained through calculation, so as to improve the calculation efficiency of the adjustment duration, and provide a better communication service for the user.

It should be noted that the above methods for calculating the adjustment duration are only examples, and may be specifically set according to specific situations, other calculation methods not described herein are also within the protection scope of the present application, but are not repeated herein.

At operation S1003, determining a timing advance maintained by the current terminal according to the position information of the current terminal and the serving base station.

The timing advance maintained by the current terminal is a timing advance determined according to a real distance from the current terminal to the serving base station and the propagation speed of the wireless signal.

At operation S1004, determining a TA for initiating random access to the target base station according to the TA maintained by the current terminal and the adjustment duration.

The adjustment duration may be obtained through different implementations in operation S1002, so that the adjustment duration is more accurate, and further, the accuracy of the TA for initiating the random access to the target base station is improved.

At operation S1005, sending a random access request to the target base station according to the TA for initiating the random access to the target base station.

In the present application, in a case where the 5G terminal successfully accesses the serving base station and acquires the handover instruction, the adjustment duration is obtained through calculation in different calculation modes, then the second sending time is determined according to the first sending time and the adjustment duration, and the random access request is sent to the target base station at the second sending time, so that the 5G terminal can be quickly switched to the target base station, the quality of communication service of the 5G terminal is guaranteed, and the user experience is improved.

It should be noted that the present application is not limited to the specific configuration and processing described above and shown in the accompanying drawings. For convenience and simplicity of description, detailed description of known methods is omitted in the present application, specific working processes of the module and the apparatus described above may refer to corresponding processes of the above method, which are not repeated here.

Figure 11:
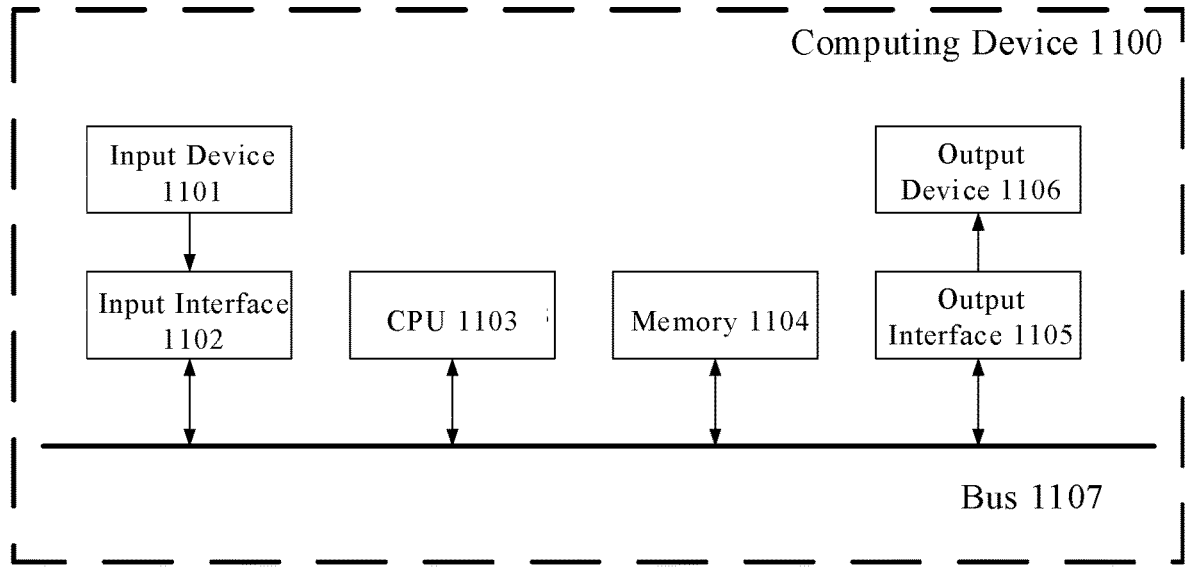
FIG. 11 is a schematic diagram of exemplary hardware architecture of a computing device for implementing a random access method or a random access apparatus according to the present application.

FIG. 11 is a schematic diagram of exemplary hardware architecture of a computing device for implementing a random access method or a random access apparatus according to the present application.

As shown in FIG. 11, a computing device 1100 includes an input device 1101, an input interface 1102, a central processing unit (CPU) 1103, a memory 1104, an output interface 1105, an output device 1106, and a bus 1107. The input interface 1102, the CPU 1103, the memory 1104, and the output interface 1105 are interconnected via the bus 1107, and the input device 1101 and the output device 1106 are connected to the bus 1107, and further to other components of the computing device 1100, via the input interface 1102 and the output interface 1105, respectively.

Specifically, the input device 1101 receives input information from outside and transmits the input information to the CPU 1103 through the input interface 1102; the CPU 1103 processes the input information based on computer-executable instructions stored in the memory 1104 to generate output information, temporarily or permanently stores the output information in the memory 1104, and then transmits the output information to the output device 1106 through the output interface 1105; the output device 1106 outputs the output information outside of the computing device 1100 for use by a user. The computing device 1100 is configured to perform the random access method described above.

In some implementations, the computing device shown in FIG. 11 may be implemented as a random access system including: a memory configured to store a computer program; and a processor configured to execute the computer program stored in the memory to perform the random access method described above.

The present application further provides a computer-readable storage medium having a computer program stored thereon, the computer program, executed by a processor, causes the processor to perform the random access method described above.

The above description is only for exemplary embodiments of the present application, but is not intended to limit the scope of the present application. In general, the present application may be implemented in hardware or special purpose circuits, software, logic or any combination thereof. For example, some aspects may be implemented in hardware, while other aspects may be implemented in firmware or software which may be executed by a controller, a microprocessor or other computing devices, although the present application is not limited thereto.

The present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object code written in any combination of one or more programming languages.

The block diagram of any logical flowchart in the accompanying drawings of the present application may represent program operations; or may represent interconnected logic circuits, modules, and functions; or may represent a combination of program operations and logic circuits, modules, and functions. The computer program may be stored in the memory. The memory may be of any type suitable for the local technical environment and may be implemented by using any suitable data storage technology, such as, but is not limited to, a Random Access Memory (RAM), a Read-Only Memory (ROM), an optical storage device and system (a digital video disc (DVD) or a compact disc (CD)) and the like. The computer-readable medium may include a non-transitory storage medium. The data processor may be of any type suitable for the local technical environment, such as, but is not limited to, a general computer, a specific computer, a microprocessor, a digital signal processor (DSP), an application specific integrated circuit (ASIC), a field programmable gate array (FPGA), and a processor based on a multi-core processor architecture.

Through exemplary and non-limiting examples, a detailed description of the exemplary embodiments of the present application is provided above. Various modifications and adaptations to the above embodiments may be apparent to those skilled in the relevant art with reference to the accompanying drawings and the appended claims, without departing from the scope of the application. Accordingly, the proper scope of the present application is to be determined according to the claims.

What is claimed is:

1. A random access method, comprising:
determining a time-adjustment step length $\Delta_{TA}$ according to a physical random access channel (PRACH) format configured for a serving cell where a current terminal is located and a propagation speed of a wireless signal;
determining an initial timing advance $TA_0$ according to positioning information acquired from a positioning system;
determining a $TA_N$ according to the time-adjustment step length $\Delta_{TA}$, a total number N of attempt rounds and the initial timing advance $TA_0$, $TA_N=TA_0\pm(N-1)*\Delta_{TA}$; and
initiating at least one round of random access attempt to a base station according to the $TA_N$ until the current terminal successfully accesses the base station.

2. The method according to claim 1, wherein the determining a $TA_N$ according to the time-adjustment step length $\Delta TA$, a total number N of attempt rounds and the initial timing advance $TA_0$ comprises:
determining a $TA_N$ of a current round according to the time-adjustment step length $\Delta_{TA}$, a total number N of attempt rounds in the current round and the initial timing advance $TA_0$;
sending circularly a random access request to the base station according to the $TA_N$ of the current round;
in response to that a random access of the current round is determined to be failed, updating the number N of attempt rounds; and
determining a $TA_N$ of a next round according to the time-adjustment step length $\Delta_{TA}$, the updated number N of attempt rounds and the initial timing advance $TA_0$.

3. The method according to claim 2, wherein the determining a $TA_N$ of a current round according to the time-adjustment step length $\Delta_{TA}$, a total number N of attempt rounds in the current round and the initial timing advance $TA_0$ comprises:
during performing a first round of random access attempt, setting the time-adjustment step length $\Delta_{TA}$ to be zero, and determining the initial timing advance $TA_0$ as a $TA_N$ of the first round of random access attempt.

4. The method according to claim 1, wherein the determining a time-adjustment step length $\Delta_{TA}$ according to a PRACH format configured for a serving cell where a current terminal is located and a propagation speed of a wireless signal comprises:

determining a coverage radius of the serving cell according to the PRACH format;

determining a preset threshold of the time-adjustment step length according to the coverage radius of the serving cell and the propagation speed of the wireless signal; and determining the time-adjustment step length $\Delta_{TA}$ according to the preset threshold of the time-adjustment step length, wherein the time-adjustment step length $\Delta_{TA}$ is greater than or equal to zero, and less than or equal to the preset threshold of the time-adjustment step length.

5. The method according to claim 1, wherein the determining an initial timing advance $TA_0$ according to positioning information acquired from a positioning system comprises:

acquiring a real distance between the current terminal and the base station from the positioning system; and in response to that the real distance is determined to be greater than a preset distance threshold, determining the initial timing advance $TA_0$ according to the real distance and the propagation speed of the wireless signal.

6. An electronic device, comprising:

at least one processor; and a memory having at least one computer program stored thereon, the at least one computer program, executed by the at least one processor, causes the at least one processor to perform the method of claim 1.

7. A non-transitory computer-readable storage medium having a computer program stored thereon, the computer program, executed by a processor, causes the processor to perform the method of claim 1.

\* \* \* \* \*